US005751329A

United States Patent [19]

Bearss et al.

[11] Patent Number: 5,751,329

[45] Date of Patent: May 12, 1998

[54] IONOGRAPHIC COLOR PRINTER WITH PLURAL PRINT HEADS REMOVABLE TONER CARTRIDGE AND ONE-TIME USABLE POLYMERIC WEB

[75] Inventors: James G. Bearss; Thomas Camis, both of Boise, Id.

[73] Assignee: Hewlett-Packard Company, Palo Alto, Calif.

[21] Appl. No.: 667,339

[22] Filed: Jun. 20, 1996

Related U.S. Application Data

[63] Continuation of Ser. No. 206,478, Mar. 4, 1994, abandoned.

[51] Int. Cl.[6] .............................. B41J 2/385; G03G 9/08; G03G 15/01; G01D 15/06

[52] U.S. Cl. .............................. 347/156; 347/117; 347/139

[58] Field of Search .............................. 347/120, 125, 347/126, 127, 128, 111, 139, 112, 119, 117, 115, 156; 399/321

[56] References Cited

U.S. PATENT DOCUMENTS

| | | | |
|---|---|---|---|
| 4,160,257 | 7/1979 | Carrish | 347/128 |
| 4,939,543 | 7/1990 | Barker | 347/125 |
| 5,121,167 | 6/1992 | Gundlach | 355/296 |
| 5,176,974 | 1/1993 | Till et al. | 347/120 |
| 5,537,199 | 7/1996 | Takai et al. | 347/115 |

*Primary Examiner*—Benjamin R. Fuller
*Assistant Examiner*—Racquel Yvette Gordon

[57] ABSTRACT

A color printer incorporating the invention hereof includes an ionographic image projection head which employs AC and DC potentials to provide an ion pool from which ions may be projected onto a movable dielectric surface. Plural developer modules are arranged about the dielectric surface, each developer module including an ion imaging head and a color toner module. Each developer module, after ion-beam imaging the movable dielectric surface, develops the charge image on the dielectric surface by bringing it into contact with a single color toner module. A processor controls each ionographic image projection head and each associated toner module to immediately apply the color toner after imaging of the dielectric surface. A transfer station is located downstream from the plural developer modules and enables transfer of the full color toned image from the dielectric surface to a sheet after a single pass of the dielectric surface past the plural developer modules.

11 Claims, 6 Drawing Sheets

DAD PRINT MODE

CAD PRINT MODE

IONOGRAPHIC COLOR PRINTER WITH PLURAL PRINT HEADS REMOVABLE TONER CARTRIDGE AND ONE-TIME USABLE POLYMERIC WEB

This is a continuation of application Ser. No. 08/206,478 filed on Mar. 4, 1994 now abandoned.

FIELD OF THE INVENTION

This invention relates to electrostatic printers which employ an ion deposition source to produce a latent image on the surface of a dielectric material, and more particularly, to such a printer that employs multiple ionographic imaging heads to produce a color image.

BACKGROUND OF THE INVENTION

Electrostatic imaging systems are well known in the art that employ either drums or continuous belts for imaging purposes. The imaging element is generally a laser whose beam is image-wise scanned across the belt or drum to produce a desired image. In a color electrophotographic imaging system, generally four passes of the drum or belt are required past the imaging laser to enable a full color image to be produced. The full color image is then transferred, either directly or indirectly, to a paper sheet.

The laser "engine" portion of a color electrophotographic printer is both expensive and requires precise alignment to enable accurate super-position of cyan, magenta, yellow and black color planes to create a complete color image. To reduce the overall cost of such a color printer, only one laser imaging station is generally provided.

In lieu of using a laser to alter a charge state on a photoconductive drum or belt, the prior art has suggested use of an ion beam source. U.S. Pat. No. 4,160,257 to Carrish discloses an ion beam generator which comprises orthogonally oriented drive electrodes that are separated by a solid dielectric. At intersections of the drive electrodes, an aperture is positioned in one drive electrode so that when a high frequency signal is applied between the intersecting electrodes, a high intensity field is set up in the aperture, thereby ionizing a gas within the aperture and creating an ion "pool". A screen electrode encloses the area where the ion pool is created and also contains an aperture that is aligned with the aperture in one of the drive electrodes. Upon application of a proper DC potential to the screen electrode, ions from the ion pool are accelerated towards a dielectric surface. An opposing side of the dielectric surface is in contact with a conductive plate to which a voltage is applied that provides an attracting electrostatic field. As a result, a latent electrostatic image is produced on the dielectric surface which is then developed by an appropriate toning mechanism. Carrish makes no mention of application of his ion generator to a multi-color printer.

Accordingly, as an object of this invention to provide an improved color printer wherein a color image may be created during a single pass of a dielectric surface past plural ionographic image projection heads.

It is yet another object of this invention to provide an improved ionographic image projection head that is replaceable as a unit, upon exhaustion of developer toner in an associated toner module.

It is still another object of this invention to provide an ionographic imaging apparatus wherein either liquid or dry toner may be employed to develop an image.

It is still another object of this invention to provide an ionographic print mechanism that can employ either a reusable dielectric imaging medium or a low cost, disposable dielectric imaging medium.

SUMMARY OF THE INVENTION

A color printer incorporating the invention hereof includes an ionographic image projection head which employs AC and DC potentials to provide an ion pool from which ions may be projected onto a movable dielectric surface. Plural developer modules are arranged about the dielectric surface, each developer module including an ion imaging head and a color toner module. Each developer module, after ion-beam imaging the movable dielectric surface, develops the charge image on the dielectric surface by bringing it into contact with a single color toner module. A processor controls each ionographic image projection head and each associated toner module to immediately apply the color toner after imaging of the dielectric surface. A transfer station is located downstream from the plural developer modules and enables transfer of the full color toned image from the dielectric surface to a sheet after a single pass of the dielectric surface past the plural developer modules.

DETAILED DESCRIPTION OF THE INVENTION

Figure 1:
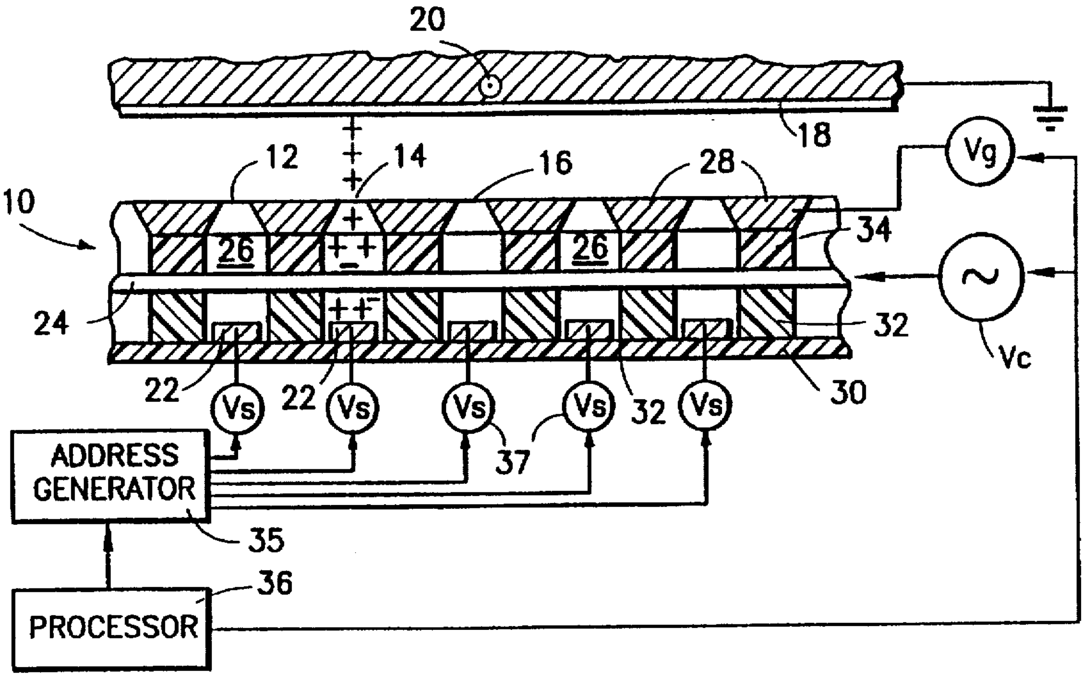
FIG. 1 is a side sectional view of an ionographic image projection head constructed in accordance with the invention hereof.

FIG. 1 shows a side sectional view of an ionographic image projection head 10 for projecting ion beams onto a dielectric surface. Ionographic image projection head 10 includes a single row of ion projectors 12, 14, 16, etc. that extend across the width of a movable dielectric surface 18. Dielectric surface 18 has a direction of movement that is out of the paper, as indicated at 20. Each ion projector 12, 14, 16, etc. includes an address electrode 22 and a transversely oriented corona electrode 24. A cylindrical opening 26 is arranged at each intersection of corona electrode 24 and an address electrode 22 so as to provide a region for an ion pool. A conductive orifice plate 28 covers the upper surface of ionographic image projection head 10 and enables a gating action to control when ions are projected from an addressed cylindrical opening 26.

A polyimid substrate 30 provides support for ionographic image projection head 10 and includes a layer of polymeric spacers 32 which support corona electrode 24. Additional polymeric spacers 34, in turn, support orifice plate 28. As one skilled in the art will realize, ionographic image projection head 10 is designed so as to be photolithographically produced, using known selective etch and/or additive procedures. As such, ionographic image projection head 10 may be produced on a mass basis and is intended to be both replaceable and disposable during normal lifetime of a printer of which it forms a part.

Figure 2:
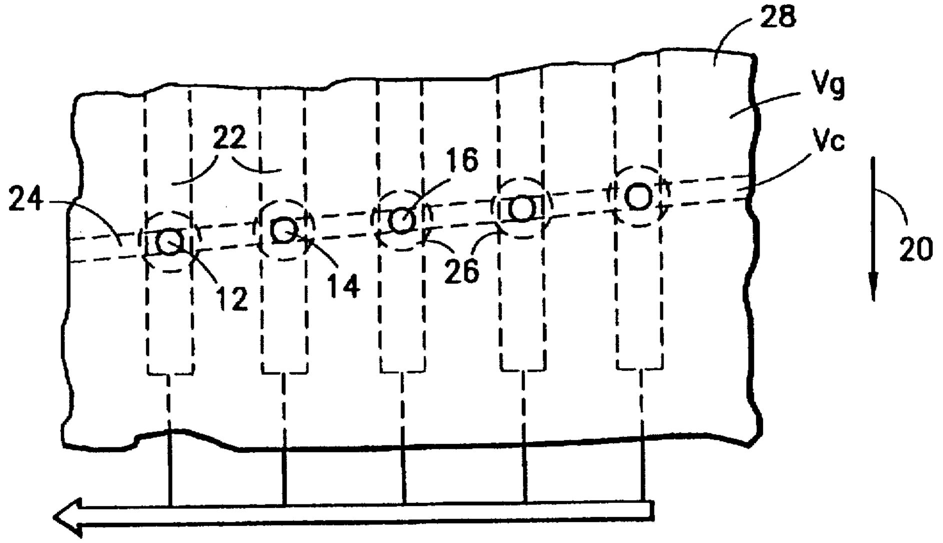
FIG. 2 is a schematic plan view of the ionographic image projection head of FIG. 1.

In FIG. 2, a schematic plan view illustrates the arrangement of each of address electrodes 22, corona electrode 24, cylindrical openings 26 and ion projectors 12, 14, 16, etc. Arrow 20 to the right of FIG. 2 indicates the direction of movement of dielectric surface 18 in relation to each of ion projectors 12, 14, 16, etc. Corona electrode 24 is canted with respect to direction of travel 20 of dielectric surface 18. The magnitude of the cant is a function of the process speed and allows appropriate deposition of ions on the dielectric plane.

Returning to FIG. 1, an address generator 35 is connected via address voltage drivers 37 to each address electrode 22 and, under control of a processor 36, selectively addresses one or more of address electrodes 22 by application of an address voltage (Vs) thereto. Processor 36 also controls application of a corona emission voltage Vc to corona electrode 24 and a gating voltage Vg to orifice plate 28. Only when an appropriate address voltage Vs is applied to an address electrode 22 is there a sufficient electrostatic force acting on ions within cylindrical opening 26 to cause a projection thereof. By appropriately timing when projection voltage Vs is applied to address electrodes 22, ions created within a cylindrical opening 26 may be accelerated towards dielectric surface 18 to alter a charge state thereon. It is to be noted that all potentials applied to ionographic image projection head 10 are values which may be controlled both as to magnitude and timing by processor 36.

Figure 3:
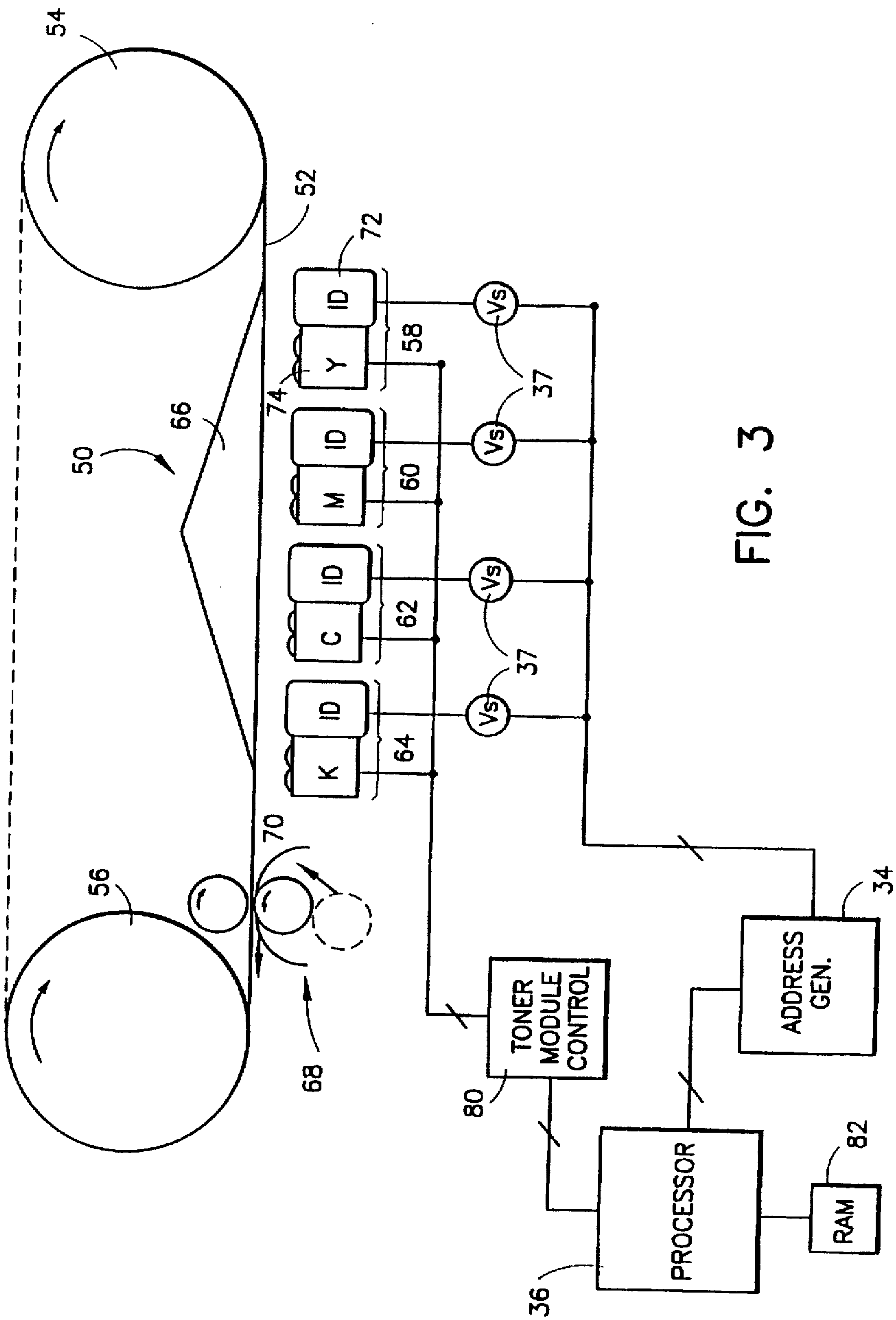
FIG. 3 is a schematic side view of an ionographic print mechanism that employs a disposable dielectric imaging surface and includes plural developer modules for both imaging and toning of the disposable dielectric surface.
Figure 4:
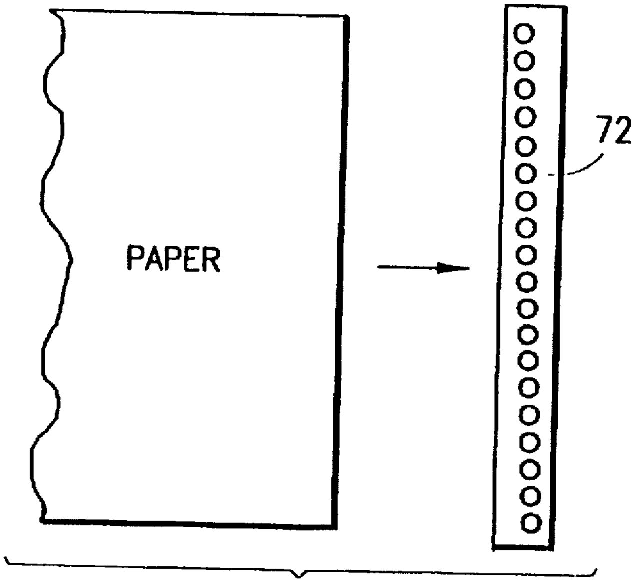
FIG. 4 is a plan view of a single ionographic image projection head employed in the print mechanism of FIG. 3, it being understood that there are four such ionographic image projection heads.

Turning to FIG. 3, a schematic side view of an ionographic print mechanism 50 is illustrated that employs a plurality of ionographic image projection heads 10, each head controlled to apply an ion pattern to a dielectric surface in accordance with a particular color plane image. FIG. 4 is a plan view of one such ionographic image projection head, as utilized in the ionographic print mechanism 50 of FIG. 3.

Ionographic print mechanism 50 employs a disposable dielectric image media 52 (e.g. a polyester web having a release layer). A supply roll 54 provides dielectric imaging media 52 to a take-up roll 56. Dielectric imaging media 52 passes from supply roll 54 through a plurality of color developer modules 58, 60, 62 and 64. A conductive support 66 provides a plane over which dielectric imaging media 52 passes and provides a datum against which individual developer modules may work so as to appropriately tone an image.

Dielectric imaging media 52, after development, travels through a transfer station 68 where a toned image present on dielectric imaging media 52 is either directly or indirectly (see dotted roller) transferred to a sheet 70. From transfer station 68, dielectric imaging media 52 is wound on take-up roll 56 where, upon exhaustion of dielectric imaging media 52 from supply roll 54, both supply roll 54 and take-up roll 56 may be removed and disposed of.

While not shown in FIG. 3, ionographic print mechanism 50 is equally operable with other dielectric imaging media known to those skilled in the art, i.e., a drum having an appropriate dielectric imaging surface positioned thereon or a reusable dielectric belt (see dotted line) which passes over rollers positioned as shown in FIG. 3 (i.e. where supply roll 54 and take up roll 56 are illustrated).

Developer modules 58, 60, 62, and 64 are physically identical and are preferably constructed so as to be replaceable items in ionographic print mechanism 50. Each developer module includes an ionographic image projection head 72 (as shown in FIGS. 1 and 2) and a toner module 74. Each toner module 74 may be made movable with respect to its associated ionographic image projection head 72 so as to enable the toner module 74 to come into contact with dielectric imaging media 52. Alternatively, camming mechanisms (not shown) may be positioned above each toner module 74 so as to selectively move dielectric imaging media 52 into contact with a selected toner module 74. It is preferred that each ionographic image projection head 72 and toner module 74 be removable, as a unit, so as to enable replacement when a toner supply in a toner module 74 has been exhausted.

Ionographic print mechanism 50 is able to produce a complete color image on dielectric imaging media 52 during one pass of media 52 over developer station 58, 60, 62 and 64. Dielectric imaging media 52, in its disposable form, preferably comprises a polyester sheet that includes a relatively hard dielectric release layer. Such a release layer may be any of a wide variety of silicones and silicone co-polymers.

Operation of ionographic print mechanism 50 is controlled by processor 36 which, via address generator 34 (as above described) enables appropriate image-wise ion deposition on dielectric imaging media 52. Processor 36, via toner module control circuit 80, operates each of the four color toner modules 74 shown in FIG. 3. A random access memory (RAM) 82 includes four color plane images that, together, comprise a complete color image. One image plane is provided for each of yellow, magenta, cyan, and black image colors respectively.

Operation of ionographic print mechanism 50 commences by processor 36 causing address generator 34 to appropriately address ionographic image projection head 72 to apply succeeding lines of image dots under control of a yellow image plane from RAM 82. Immediately thereafter, yellow toner module is activated to tone the ionographically charged areas with a yellow toner. In the embodiment shown in FIG. 3, liquid toner modules 74 are employed and will be described below with respect to FIG. 5. Sufficient to say at this juncture that as succeeding image dot lines of ionic charge are applied via ionographic image projection head 72, they are toned with a yellow toner through operation of liquid toner module 74. The yellow toned image then proceeds to developer module 60 where a magenta image is produced in registration with the yellow-toned image. As indicated previously, immediately after image dot charges from the magenta color plane are applied to dielectric imaging media 52, toner module control 80 operates the magenta toner module to bring magenta toner into contact with dielectric imaging media 52 so as to accomplish the appropriate magenta toning.

Similar actions occur at cyan developer module 62 and black developer module 64. Thus, at the input to transfer station 68, dielectric imaging media 52 has superimposed yellow, magenta, cyan and black image planes, all toned in registration and ready for transfer to sheet 70. A release layer on dielectric imaging media 52 enables transfer of the full color image to paper 70. To the extent that any residual toner remains on dielectric imaging media 52, it is of no concern as it will not be used in a subsequent print action.

Figure 5:
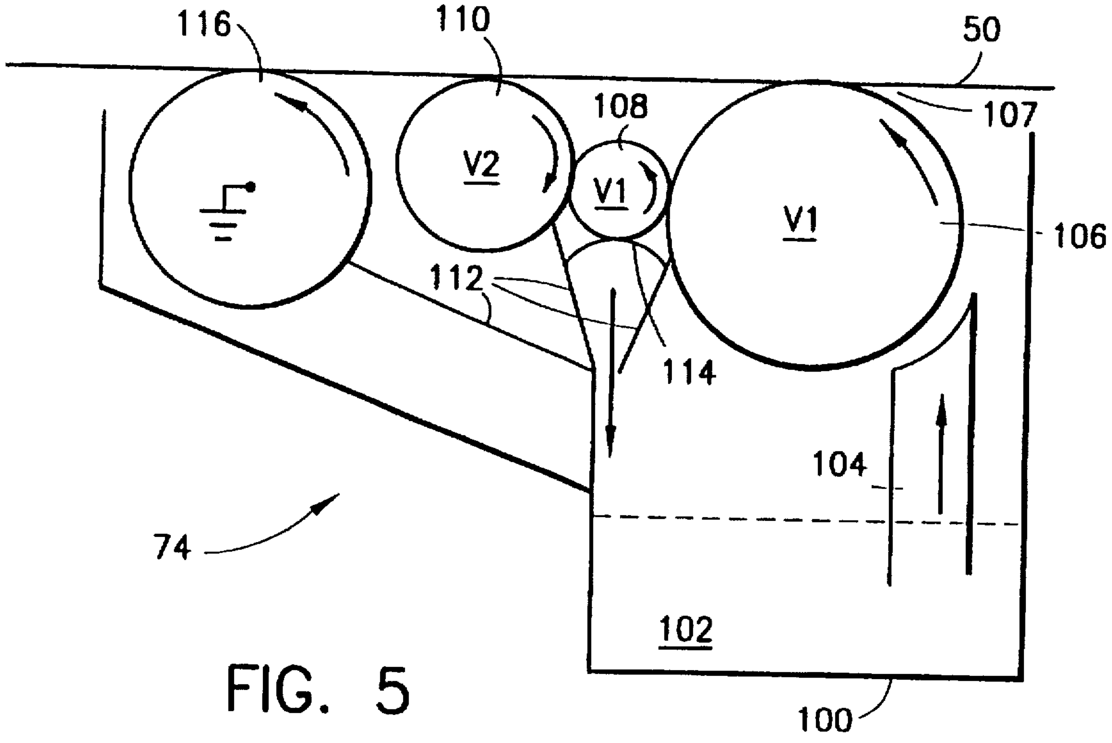
FIG. 5 is a schematic side sectional view of a liquid toner module employed with the ionographic print mechanism shown in FIG. 3.

Turning to FIG. 5, an exemplary liquid toner module 74 is illustrated. Each liquid toner module 74 comprises a housing 100 which includes supply of color liquid toner 102. A plenum 104 provides a supply of liquid toner 102 to the surface of a developer roller 106. A pump (not shown) is positioned in housing 100 and assures a continuing liquid color toner supply through plenum 104 to developer roller 106. The liquid color toner is carried by developer roller 106 to a nip 107 between developer roller 106 and dielectric imaging media 50. Nip 107 between developer 106 and dielectric imaging media 50 is filled with toner and is the place where the first development action takes place. There an image forms on dielectric imaging media 50 and a reverse image plates out on developer roller 106.

Backplating is cleaned from developer roller 106 by a foam cleaning roller 108. Foam cleaning roller 108 scrubs the surface of developer roller 106 and carries off backplated toner and excess liquid (which returns to liquid toner supply 102). Foam cleaning roller 108 is also in contact with a reverse roller 110 which rotates in a direction that is reverse to the direction of travel of dielectric imaging media 50. The potentials applied to developer roller 106 and foam cleaning roller 108 are approximately equivalent (V1 volts). However, reverse roller 110 is maintained at a lower potential (V2). This causes toner to plate onto reverse roller 110 and causes it to be a scavenger roller for liquid on dielectric surface 50 and residual toner on both foam roller 108 and dielectric surface 50. Each roller engages a blade 112 which accomplishes additional toner and liquid cleaning. Backplated toner and excess liquid is funnelled onto the surface of a rough plastic screen 114 located below foam roller 108. Foam roller 108 rides on screen 114 and the frictional shear force between screen 114 and foam roller 108 is used to re-disperse the backplated toner and to return it to toner reservoir 102.

A conductive, grounded, squeegee roller 116 contacts the surface of dielectric media 50 and is the last drying step for the image before it moves to a next developer module. Squeegee roller 116 is grounded to insure that the image on dielectric imaging media 50 has no residual charge and that dielectric imaging media 50 will enter a succeeding developer module in a "near" zero charge state.

Figure 6:
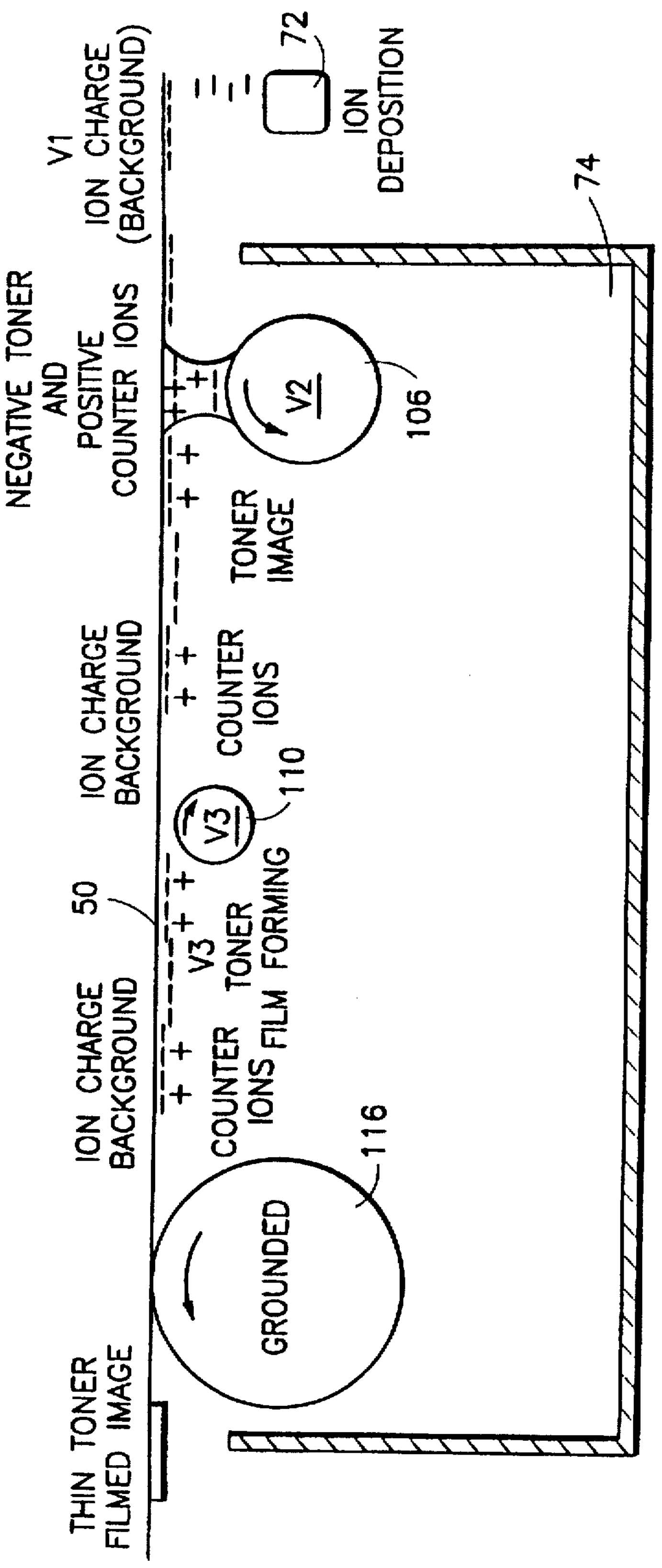
FIG. 6 is a schematic drawing of a liquid toner developer module using a charge area development (CAD) print mode.
Figure 7:
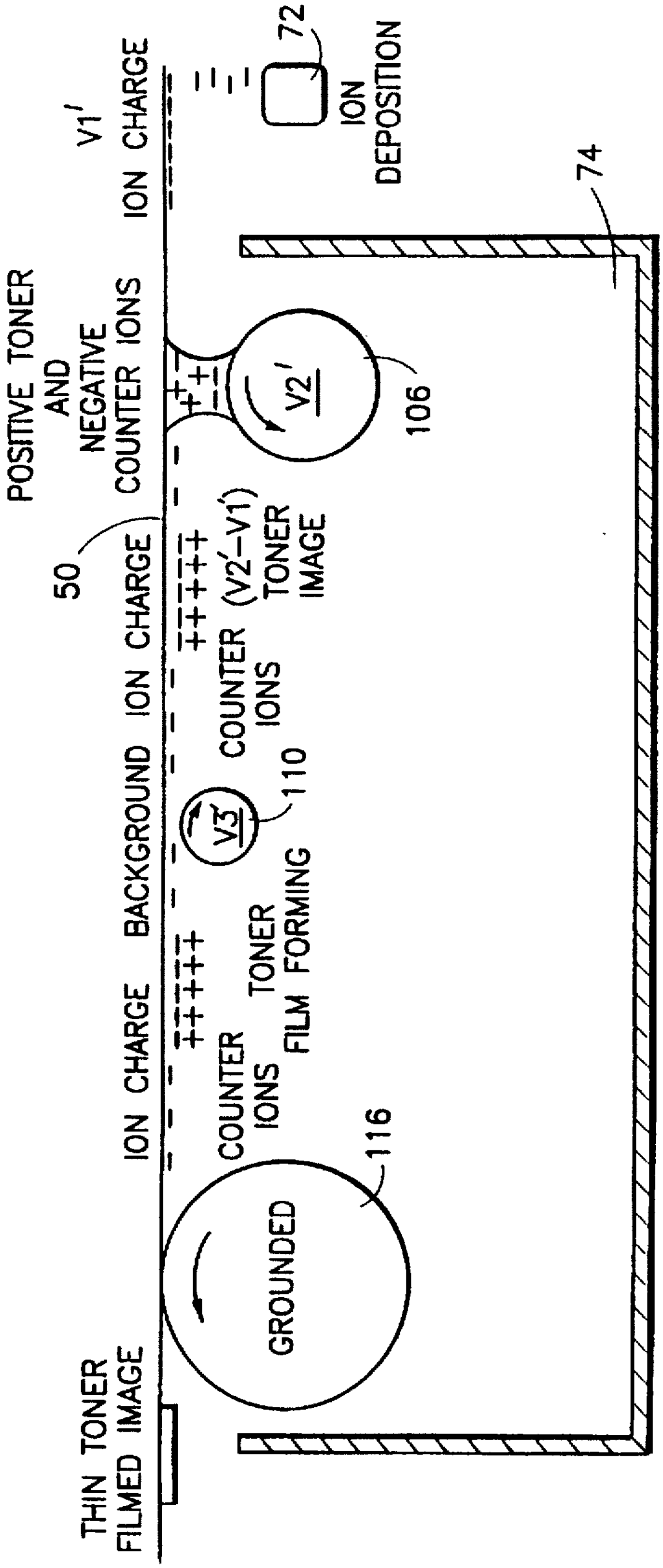
FIG. 7 is a side schematic view of a liquid toner developer module using a discharge area development (DAD) print mode.

Turning now to FIGS. 6 and 7, the operation of a toner module 74 will be described in the context of both a discharge area development (DAD) print mode and a charge area development (CAD) print mode. In the DAD print mode, charged toner is "pushed" by the charge state on dielectric imaging media 50 into areas where ionographic image projection head 72 did not deposit charge. In the CAD print mode, charged toner is pulled into areas of dielectric imaging media 50 by the charge state created by ionographic image projection head 72.

In the DAD print mode illustrated in FIG. 6, ionographic image projection head 72 lays down ions in regions where toner is not to be deposited. Toner is thereafter developed only in non-charged (blank) regions. As dielectric imaging media 50 moves into the liquid toner present at development roller 106 the chemically charged, liquid toner particles are pushed into non-charged regions by voltage V2 on developer roller 106. Liquid toner thus deposits in this region until sufficient toner is deposited to result in a near zero field condition in nip 107.

In the region of dielectric imaging media 50 that is charged to V1 volts by ionographic image projection heads 72, only (V2–V1) volts of chemically charged counter ions deposit. This reduces the voltage of the background region to V2. The counter ions exhibit low mass and are transparent.

As the V2 voltage plane of background and toner image moves to reverse roller 110, two things happen. First, reverse roller 110 shears off excess liquid. Reverse roller 110 has a motion opposite to the direction of the dielectric imaging media 50 and moves at approximately 3–5 times the linear speed of dielectric imaging media 50. It is preferred, that the gap at reverse roller 110 be approximately 1.5–2.5 mils and the gap at development roller 106 be approximately 3–4 mils. Second, reverse roller 110 is energized to a level of V3 volts. This voltage acts to reduce the image Voltage by V2–V3 and to clean up image edges and background on dielectric imaging media 50.

The resulting V3 image and background plane then moves to grounded, conductive, squeegee roller 116 which is in full contact with dielectric imaging media 50. Squeegee roller 116 discharges the V3 volts and presses any remaining liquid out of the toned areas. Squeegee roller 116 is preferably heated to approximately 50° C. which fixes the liquid toner, completes the film forming process and makes the image ready to enter a next development module.

In FIG. 7, an exemplary CAD print mode method is illustrated and commences by ionographic image projection heads 72 laying down negative ions in regions where toner is to be deposited. The liquid toner will be developed only in the charged regions. As the charged dielectric imaging media 50 moves into nip 107 between development roller 106 and dielectric imaging media 50, the chemically charged liquid toner particles are pulled to the surface of the dielectric by voltage difference V2'–V1' of developer roller 106 and the deposited charge. The liquid toner thus deposits in the charged regions until the field in the nip is near zero.

In the region of dielectric imaging media 50, that was not charged by ions from ionographic image projection heads 72, V2' volts of chemically charged, counter ions deposit. The counter ions exhibit low mass and are transparent. As this voltage plane of background and toner image moves to reverse roller 110, two effects occur. First, reverse roller 110 shears off excess liquid carried through nip 107 between development roller 106 and dielectric imaging media 50. Reverse roller 110 has a motion opposite to the direction of dielectric imaging media 50 and is positioned similarly with respect to dielectric imaging media 50 as in the DAD development mode. Second, reverse roller 110 is set at a voltage V3' which acts to reduce the voltage and cleans up image edges and background on dielectric imaging media 50.

This voltage plane V4' then moves into contact with conductive squeegee roller 116 (in full contact with dielectric imaging media 50). Conductive squeegee roller 116 is grounded which allows a discharge to a near zero volt level and presses liquid out of the liquid toned areas of the image. Conductive squeegee roller 116 is heated to about 25°–50° C. and fixes the toned image.

Liquid toner enables use of both CAD and DAD print modes and Dot on Dot print techniques. However, dry toner exhibits a residual charge after development so Dot on Dot images are not directly available. Dot-next-to-Dot may be used, but provides a lessened color resolution image.

When a re-usable belt is employed as dielectric imaging media 50, it may be comprised of a moderately resistive material that enables charge to leak off after image transfer (while being retained through the developer modules. Otherwise a corona charge management system is necessary to bring the belts charge state to near zero.

Figure 8:
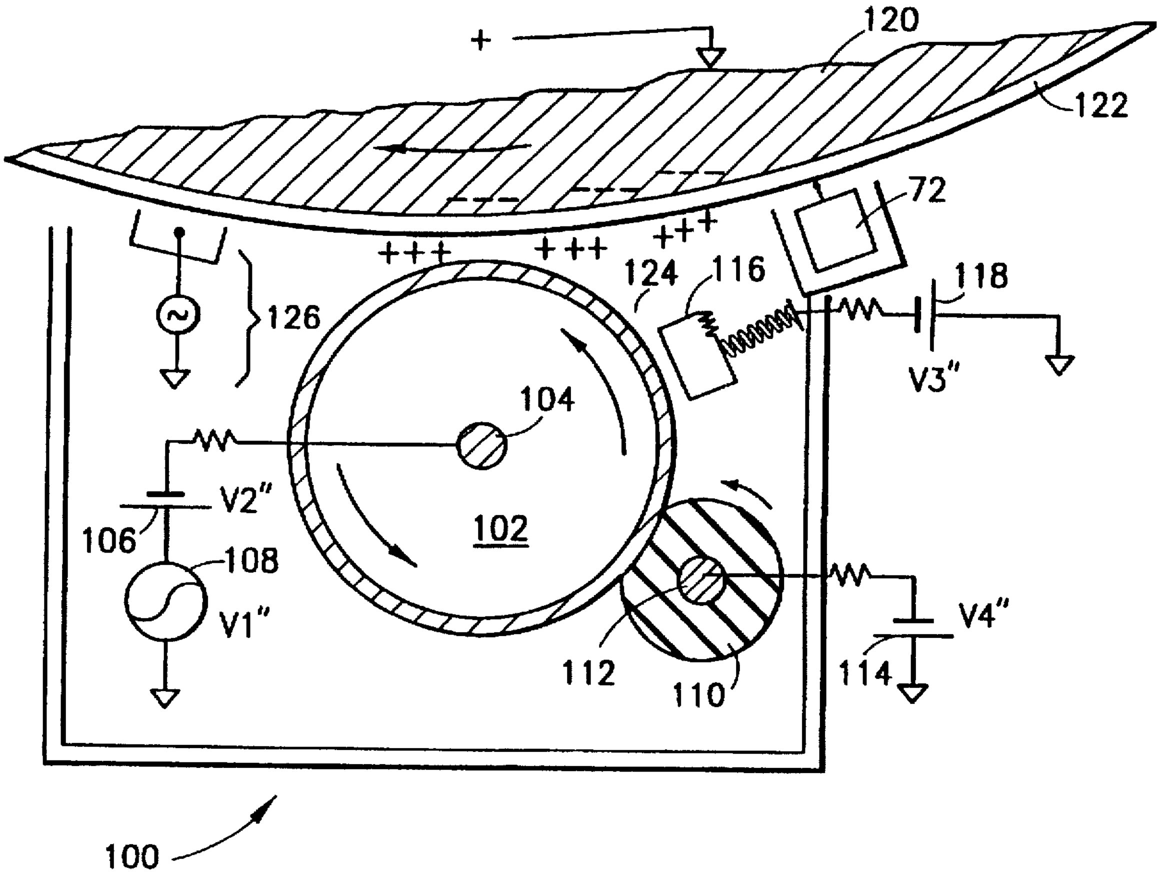
FIG. 8 illustrates a dry powder non-magnetic toner color station for use with a reusable imaging drum or belt, as the case may be.

Referring to FIG. 8, a dry powder toner module 100 is shown that is usable with the invention hereof. Ionographic image projection head 72 operates in an identical manner as above described with respect to the liquid toner embodiment of the invention. A developer roller 102 has its inner core member 104 connected through a resistor to a first source of DC bias 106 (V2") and then to a source of AC bias 108 (V1") which produces an output Vsin(wt). A resilient toner charging roller 110 has its inner core member 112 connected through a resister to a DC bias voltage source 114 (V4"). A toner metering bar 116 is also connected to a DC voltage source 118 (V3").

An imaging drum 120 includes a dielectric surface 122 upon which powder toner 124 is deposited. It is to be understood that drum 120 and dielectric surface 122 may be replaced by a dielectric belt, as described above.

DC voltage 106 (V2") and AC voltage 108 (V1") combine to apply a projection voltage Vp=V1"+V2" to charged toner particles 124 that are located between the surface of dielectric layer 122 and developer roller 102. The projection potential Vp serves to overcome toner adhesion effects to developer roller 102 and acts to propel properly charged toner particles onto dielectric layer 122 in regions that have been appropriately charged by an ionographic image projection head 72. A repulsion voltage is also present where dielectric layer 122 has not been appropriately charged and serves to repel toner from background regions.

During toner development, the dry powder toner 124 experiences a time-varying electrostatic field which projects the changed toner particles across the air gap between the development roller 102 and dielectric surface 122. The color toner is projected towards dielectric surface 122 with a force and velocity that is dependent upon the magnitude of the projection potential (in addition to other physical and electrical parameters that effect the adhesion of the toner to dielectric surface 122). A corona erase module 126 is employed when a DAD procedure is used.

It is to be understood that FIG. 8 shows only one color toner module and that further color toner modules for additional single-color powder toners are positioned about the periphery of imaging drum 120. Dry toner transfer and fusing occur in a conventional manner. Further, each toner module 100 includes a means for feeding powder toner between charging roller 110 and developer roller 102 which has been eliminated from FIG. 8 so as to not overcomplicate the view. Finally, as imaging drum 120 is not a replaceable item, it follows that a cleaning station subsequent to image transfer is required. Such a cleaning station is not shown in the drawings, but is consistent with prior art cleaning stations employed for powder toner imaging systems.

It is to be understood that the foregoing description is only illustrative of the invention. Various alternatives and modifications can be devised by those skilled in the art without departing from the invention. For instance, while the invention has been described in the context of a printer it is equally applicable to any instrumentability that employs electrostatic image transfer to a sheet. Accordingly, the present invention is intended to embrace all such alternatives, modifications and variances which fall within the scope of the appended claims.

What is claimed is:

1. A color printer comprising:

a movable dielectric surface for manifesting a charge state;

plural color developer modules arranged to engage said dielectric surface, each color developer module including an ion imaging module and an associated toner module, said ion imaging module for projecting an image-wise ion stream at said movable dielectric surface to cause a charge state to be emplaced on said movable dielectric surface in response to single color imaging signals applied to said ion imaging module, said associated toner module for applying a single color toner to said movable dielectric surface in accordance with a charge state created by an associated ion imaging module, said associated toner module including a heated conductive squeegee roller in direct contact with said movable dielectric surface for both fixing said toned image and for discharging any residual charge on said dielectric surface;

processor means for applying single color image signals to said ion imaging module and for controlling said associated toner module to apply toner to said movable dielectric surface;

means for moving said dielectric surface past said plural color developer modules to enable toner of multiple colors to be applied to said movable dielectric surface in registration and under control of said processor means; and transfer means for transferring a toned multicolor image from said movable dielectric surface to a sheet after said image has passed a last one of said plural developer modules, whereby said toned multicolor image is produced during a single pass of said movable dielectric surface past said plural color developer modules.

2. The color printer as recited in claim 1, wherein said movable dielectric surface comprises a one-time usable polymeric web, and said means for moving said dielectric surface comprises supply means and a take up means, said means for moving causing said polymeric web to be fed from said supply means and to be taken up by said take up means.

3. The color printer is recited in claim 2 wherein said supply means is a supply roll and said take up means is a take up roll.

4. The color printer as recited in claim 1 wherein said movable dielectric surface comprises a dielectric layer, at least a portion of which is in contact with a conductor, said dielectric layer having a resistivity that allows said charge state to discharge into said conductor after said movable dielectric surface has moved past said transfer means.

5. The color printer as recited in claim 4 wherein said movable dielectric surface forms a continuous web.

6. The color printer as recited in claim 1 wherein said ion imaging module comprises:

a plurality of ion chambers arranged across a width of said movable dielectric surface, each said ion chamber including an address electrode, a corona electrode and a conductive orifice plate defining an opening from said ion chamber, said address electrode and corona electrode separated by an air gap, whereby application of a breakdown potential between said corona electrode and an address electrode causes ionization of air in said air gap.

7. The color printer as recited in claim 6 wherein a control voltage applied to said orifice plate enables acceleration of ions towards said movable dielectric surface.

8. The color printer as recited in claim 7 wherein said corona electrode is continuous across said plurality of ion chambers and a separate address electrode intersects each said ion chamber.

9. The color printer as recited in claim 1 wherein said associated toner module employs liquid toner and said squeegee roller is connected to a reference potential, said squeegee roller assuring that said movable dielectric surface exhibits a reference potential charge state upon exiting from engagement with said toner module.

10. The color printer as recited in claim 1 wherein each said toner module employs a powder toner and further includes corona means for assuring a near zero state potential on said movable dielectric surface upon exiting engagement with each said toner module.

11. The color printer as recited in claim 1 wherein associated said toner module is removable and replaceable by a user.

* * * * *